(12) United States Patent
Janssen et al.

(10) Patent No.: US 9,099,744 B2
(45) Date of Patent: Aug. 4, 2015

(54) PARTICULATE POROUS CARBON MATERIAL AND USE THEREOF IN LITHIUM CELLS

(75) Inventors: Nicole Janssen, Bermersheim (DE); Arno Lange, Bad Duerkheim (DE); Gerhard Cox, Bad Duerkheim (DE); Alexander Panchenko, Ludwigshafen (DE); Stefan Spange, Orlamuende (DE); Falko Boettger-Hiller, Altenburg (DE)

(73) Assignee: BASF SE, Ludwigshafen (DE)

( * ) Notice: Subject to any disclaimer, the term of this patent is extended or adjusted under 35 U.S.C. 154(b) by 170 days.

(21) Appl. No.: 13/431,531

(22) Filed: Mar. 27, 2012

(65) Prior Publication Data
US 2012/0251889 A1    Oct. 4, 2012

Related U.S. Application Data

(60) Provisional application No. 61/469,887, filed on Mar. 31, 2011.

(51) Int. Cl.
| | |
|---|---|
| *H01M 4/587* | (2010.01) |
| *H01M 4/136* | (2010.01) |
| *H01M 4/38* | (2006.01) |
| *H01M 10/052* | (2010.01) |
| *H01M 10/0566* | (2010.01) |
| *H01B 1/12* | (2006.01) |
| *H01G 11/24* | (2013.01) |

(Continued)

(52) U.S. Cl.
CPC ........... *H01M 4/587* (2013.01); *C01B 31/0423* (2013.01); *H01B 1/122* (2013.01); *H01G 11/24* (2013.01); *H01G 11/34* (2013.01); *H01M 4/136* (2013.01); *H01M 4/38* (2013.01); *H01M 10/052* (2013.01); *H01M 10/0566* (2013.01); *Y02E 60/122* (2013.01); *Y02E 60/13* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,833,048 A | 5/1989 | Dejonghe et al. | |
| 5,162,175 A | 11/1992 | Visco et al. | |

(Continued)

FOREIGN PATENT DOCUMENTS

| | | |
|---|---|---|
| CN | 101 986 443 A | 3/2011 |
| WO | WO 96/41387 | 12/1996 |

(Continued)

OTHER PUBLICATIONS

Katerina E. Aifantis, "Next-Generation Anodes for Secondary Li-Ion Batteries", High Energy Density Lithium Batteries, Wiley-VCH, 2010, pp. 129-164.

(Continued)

*Primary Examiner* — Sarah A Slifka
(74) *Attorney, Agent, or Firm* — Oblon, McClelland, Maier & Neustadt, L.L.P.

(57) ABSTRACT

The present invention relates to a novel particulate porous carbon material containing a carbon phase and at least one pore phase, and to the use of such materials in lithium cells, especially lithium-sulfur cells. The carbon phase forms, with the pore phase, essentially unordered co-continuous phase domains, such that the distance between adjacent domains of the pore phase is not more than 50 nm. The invention also relates to a process for producing such carbon materials and to composite materials comprising elemental sulfur and at least one inventive particulate porous carbon material.

17 Claims, 2 Drawing Sheets

(51) Int. Cl.
*H01G 11/34* (2013.01)
*C01B 31/04* (2006.01)

(56) References Cited

U.S. PATENT DOCUMENTS

| | | |
|---|---|---|
| 6,117,590 A | 9/2000 | Skotheim et al. |
| 6,300,009 B1 | 10/2001 | Yoshida et al. |
| 6,309,778 B1 | 10/2001 | Skotheim et al. |
| 6,319,633 B1 | 11/2001 | Ikeda et al. |
| 6,376,127 B1 | 4/2002 | Teranishi et al. |
| 2011/0003189 A1* | 1/2011 | Hildebrandt et al. ......... 429/129 |
| 2012/0032109 A1 | 2/2012 | Konig et al. |
| 2012/0049110 A1 | 3/2012 | Trukhan et al. |
| 2012/0052300 A1 | 3/2012 | Nozari et al. |
| 2012/0091400 A1 | 4/2012 | König et al. |
| 2012/0184702 A1 | 7/2012 | Lange et al. |
| 2013/0164635 A1 | 6/2013 | Schmidt et al. |

FOREIGN PATENT DOCUMENTS

| | | |
|---|---|---|
| WO | WO 99/33131 | 7/1999 |
| WO | WO 2007/140224 A2 | 12/2007 |
| WO | WO 2009/083082 A2 | 7/2009 |
| WO | WO 2009/083083 A1 | 7/2009 |
| WO | WO 2009/114314 A2 | 9/2009 |
| WO | WO 2009/133086 A2 | 11/2009 |
| WO | WO 2010/112580 A1 | 10/2010 |
| WO | WO 2010/112581 A1 | 10/2010 |
| WO | WO 2010/128144 A1 | 11/2010 |
| WO | WO 2011/000858 A1 | 1/2011 |
| WO | WO 2011/147924 A1 | 12/2011 |
| WO | WO 2012/028989 A1 | 3/2012 |

OTHER PUBLICATIONS

Jen-Hsien Huang, et al., "A ternary cascade structure enhances the efficiency of polymer solar cells", Journal Material Chemistry, 20, 2010, pp. 2820-2825.
B. Zhang, et al., "Enhancement of long stability of sulfur cathode by encapsulating sulfur into micropores of carbon spheres", Energy Environmental Science, 3, 2010, pp. 1531-1537.
U.S. Appl. No. 13/794,971, filed Mar. 12, 2013, Leitner, et al.
U.S. Appl. No. 13/923,715, filed Jun. 21, 2013, Lange, et al.
U.S. Appl. No. 13/387,055, filed Aug. 16, 2012, Cox, et al.
U.S. Appl. No. 13/965,509, filed Aug. 13, 2013, Panchenko, et al.
U.S. Appl. No. 13/489,713, filed Jun. 6, 2012, Garsuch, et al.
U.S. Appl. No. 13/489,101, filed Jun. 5, 2012, Gronwald, et al.
Extended European Search Report issued in patent application No. 12764268.4 dated Sep. 17, 2014.
Stefan Spange, et al., "Nanocomposites with Structure Domains of 0.5 to 3 nm by Polymerization of Silicon Spiro Compounds", Angew. Chem. Int. Ed., vol. 48, 2009, pp. 8254-8258.

* cited by examiner

PARTICULATE POROUS CARBON MATERIAL AND USE THEREOF IN LITHIUM CELLS

CROSS-REFERENCE TO RELATED APPLICATIONS

The present application is the utility application based on, and claiming benefit to, U.S. Provisional Application Ser. No. 61/469,887, filed on Mar. 31, 2011.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

1. Field of the Invention

The present invention relates to a novel particulate porous carbon material which comprises a carbon phase C and a pore phase, and to the use of such materials in lithium cells, especially lithium-sulfur cells. The invention also relates to a process for producing such carbon materials and to composite materials comprising elemental sulfur and at least one inventive particulate porous carbon material.

2. Description of the Related Art Including Information Disclosed Under 37 CFR 1.97 and 1.98

In an increasingly mobile society, mobile electrical devices are playing an ever greater role. For many years, batteries, especially rechargeable batteries (called secondary batteries or accumulators), have therefore been finding use in virtually all areas of life. There is now a complex profile of demands on secondary batteries with regard to the electrical and mechanical properties thereof. For instance, the electronics industry is demanding new, small, lightweight secondary cells or batteries with high capacity and high cycling stability to achieve a long lifetime. In addition, the thermal sensitivity and the self-discharge rate should be low in order to ensure high reliability and efficiency. At the same time, a high level of safety in the course of use is required. Lithium secondary batteries with these properties are especially also of interest for the automotive sector, and can be used, for example, in the future as energy stores in electrically operated vehicles or hybrid vehicles. In addition, there is a requirement here for batteries which have advantageous electrokinetic properties in order to be able to achieve high current densities. In the development of novel battery systems, there is also a special interest in being able to produce rechargeable batteries in an inexpensive manner.

Environmental aspects are also playing a growing role in the development of new battery systems.

The cathode of a modern high-energy lithium battery now comprises, as an electroactive material, typically lithium-transition metal oxides or mixed oxides of the Spinel type, for example $LiCoO_2$, $LiNiO_2$, $LiNi_{1-x-y}Co_xM_yO_2$ ($0<x<1$, $y<1$, M e.g. Al or Mn) or $LiMn_2O_4$, or lithium iron phosphates, for example. For the construction of the anode of a modern lithium battery, the use of lithium-graphite intercalation compounds has been proven in the last few years (Journal Electrochem. Soc. 1990, 2009). In addition, as anode materials, lithium-silicon intercalation compounds, lithium alloys and lithium titanate have been examined (see K. E. Aifantis, "Next generation anodes for secondary Li-ion batteries" in High Energy Density Li-Batteries, Wiley-VCH, 2010, p. 129-162). The two electrodes are combined with one another in a lithium battery using a liquid or else solid electrolyte. In the (re)charging of a lithium battery, the cathode material is oxidized (for example according to the following equation: $LiCoO_2 \rightarrow nLi^+ + Li_{(1-n)}Co)_2 + ne^-$). This releases the lithium from the cathode material and it migrates in the form of lithium ions to the anode, where the lithium ions are bound with reduction of the anode material, and in the case of graphite intercalated as lithium ions with reduction of the graphite. In this case, the lithium occupies the interlayer sites in the graphite structure. In the course of discharging of the battery, the lithium bound within the anode is removed from the anode in the form of lithium ions, and oxidation of the anode material takes place. The lithium ions migrate through the electrolytes to the cathode and are bound therein with reduction of the cathode material. Both in the course of discharging of the battery and in the course of recharging of the battery, the lithium ions migrate through the separator.

A central problem in the case of batteries in general, but also in the case of lithium batteries, is the limited capacity density or energy density thereof. In recent times, there has therefore been increasing emphasis on lithium-sulfur cells, i.e. lithium cells whose cathode material comprises sulfur in elemental or in polymer-bound form. In the lithium-sulfur cell, polysulfide anions are formed at the cathode in the course of discharge, and are discharged at the anode. The chemical reaction and the cathode can be represented in simplified form as follows: $2Li^+ + S_x + 2e^- \rightarrow L^+_2 S_x^{2-}$, with a decreasing number of sulfur atoms in the polysulfide anions formed as the discharging operation progresses. With a theoretical energy density of nearly 2600 Wh/kg (assuming a full reaction to give $Li_2S$—see Journal Material Chemistry, 2010, 20, 2821-2826), lithium-sulfur cells have a theoretical energy density more than 4 times higher than conventional lithium ion cells with cathode materials based on lithium-transition metal oxides.

In the case of lithium-sulfur cells, however, the relatively rapid loss of capacity with repeated charging and the associated limit in the lifetime of the cell have been found to be problematic to date. This capacity loss is attributable to the loss of sulfur from the cathode material, caused by the formation of the polysulfide anions which are soluble in the electrolyte. Since elemental sulfur itself is an insulator, greater amounts of conductive additives such as conductive blacks or metal particles have to be used in sulfur-based cathode materials. Owing to the migration of sulfides, however, insulating sulfur layers can be formed on the surface of the anode or in the region of the separator, as a result of which the cell resistance and the impedance increase.

There are in principle several approaches to counteracting the sulfur migration and the associated loss of sulfur in the cathode material.

Binding of the sulfur atoms to a carbonaceous polymer skeleton such as polycarbon sulfide (see, for example, U.S. Pat. No. 4,833,048, WO 96/41387, U.S. Pat. Nos. 6,117,590, 6,309,778). A disadvantage is found to be the complex preparation and difficulty of handling of the polymers;

use of transition metal-doped molybdenum sulfides, tungsten sulfides or titanium sulfides (see, for example, U.S. Pat. Nos. 6,300,009, 6,319,633 or 6,376,127). In this case, a lower specific capacity of the materials is accepted since the transition metals make up a comparatively high proportion of the cathode material;

use of composite materials composed of sulfur or sulfur-containing electroactive materials and adsorbents with affinity for polysulfide anions, such as porous carbon (aerogels), silica gels, aluminum oxides such as boehmite and pseudo-boehmite (see, for example, U.S. Pat. No. 5,162,175, WO 99/33131, WO 2009/114314).

B. Zhang et al, Energy Environ. Sci. 2010, 3, 1531-1537 describe a carbon/sulfur material as a cathode material for Li-sulfur cells, in which sulfur is intercalated in micropores of a microporous carbon material. The composite material, however, exhibits satisfactory discharge capacities only up to a loading with 42% sulfur.

In summary, it can be stated that the carbon/sulfur-based cathode materials known to date from the prior art are unsatisfactory with regard to the charging/discharging kinetics, and/or the cycling stability, for example decrease in the capacity, and/or high or increasing impedance after several charge/discharge cycles. The composite materials comprising a particulate semimetal or metal phase and one or more carbon phases, which have been proposed in recent times to solve these problems, are capable of solving these problems only partially, and the quality of such composite materials generally cannot be achieved in a reproducible manner. In addition, the production thereof is generally so complex that economic use is impossible.

BRIEF SUMMARY OF THE INVENTION

It is an object of the present invention to provide an electroactive material which is suitable for production of cathode materials for lithium batteries, especially for lithium-sulfur batteries, and which resolves the disadvantages of the prior art. A cathode material produced using this electroactive material should especially have at least one and especially more than one of the following properties:

high specific capacity,
high cycling stability,
low self-discharge,
good mechanical stability.

Furthermore, the materials should be producible economically and in particular in reproducible quality.

It has been found that these objects are surprisingly achieved by sulfur composite materials which comprise the carbon material defined hereinafter.

DETAILED DESCRIPTION OF THE INVENTION

Figure 1:
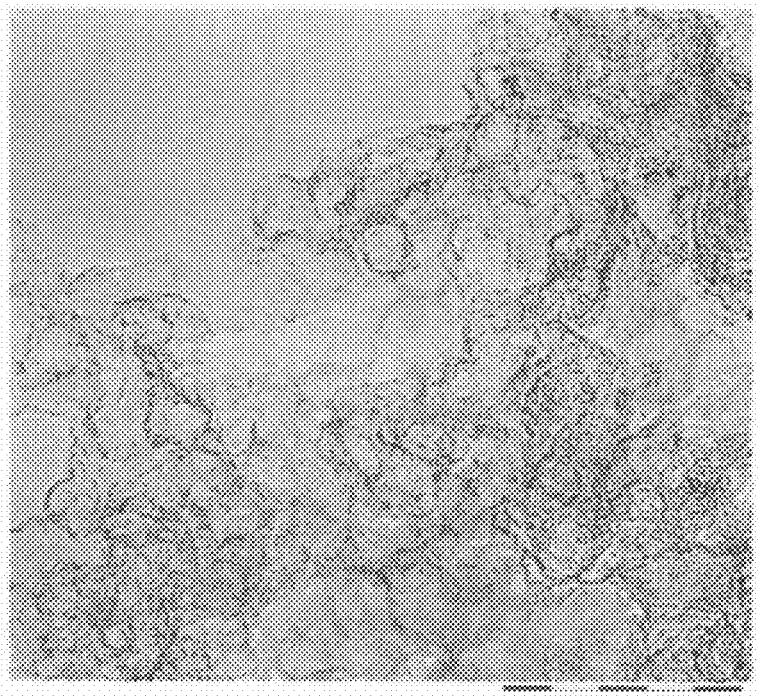
FIG. 1: TEM analysis of the sample from example 7.3 (bar 50 nm) showing that the carbon material of the hollow carbon particles is porous.

The inventive carbon material is a particulate porous carbon material which comprises a carbon phase (hereinafter also carbon phase C or C phase) and at least one pore phase (hereinafter also pore phase P or P phase), said carbon phase of the particles forming, with the pore phase, essentially unordered co-continuous phase domains, the distance between adjacent domains of the pore phase being essentially not more than 50 nm, particularly not more than 20 nm or not more than 10 nm, for example 0.5 to 50 nm, particularly 0.7 to 20 nm and especially 1 to 10 nm. This carbon material is novel and forms a first part of the subject matter of the invention.

The inventive particulate carbon material can be produced in a simple manner by a process comprising the following steps:

i. providing a particulate composite material which has at least one organic polymer phase and at least one inorganic (semi)metal oxide phase, in which the organic polymer phase and the inorganic (semi)metal oxide phase form essentially co-continuous phase domains, the mean distance between two adjacent domains of the (semi)metal oxide phase being not more than 50 nm, particularly not more than 20 nm, especially not more than 10 nm, for example 1 to 50 nm, particularly 0.7 to 20 nm and especially 1 to 10 nm, ii. carbonizing the organic polymer phase of the composite material, iii. removing the (semi)metal oxide phase by leaching.

Such a process likewise forms part of the subject matter of the present invention.

The inventive particulate carbon material is suitable in various ways for production of electrochemical cells, for example as constituent of anode materials or as a constituent of cathode materials. Accordingly, the invention further provides for the use of the inventive particulate carbon material for production of electrochemical cells.

The inventive particulate carbon material is particularly suitable for production of sulfur-containing composite materials comprising elemental sulfur. This sulfur-containing composite material is particularly suitable for production of cathode material for lithium-sulfur cells and is notable not only for high specific capacity, high mechanical stability and good processability but in particular also for leading to an improved cycling stability and hence to an improved lifetime in lithium-sulfur cells.

Accordingly, the invention further provides a composite material which comprises elemental sulfur and at least one inventive porous particulate carbon material.

The invention further provides for the use of the composite material as an electroactive cathode material in lithium-sulfur cells.

The invention further provides a lithium-sulfur cell whose cathode comprises an inventive composite material which comprises elemental sulfur and at least one inventive porous particulate carbon material.

In the inventive porous carbon material the pore phase (hereinafter also P phase) and the carbon phase (hereinafter also C phase) form domains in which the C phase and the P phase form a characteristic co-continuous arrangement. The regions in which the C phase and the P phase are present essentially as a co-continuous arrangement make up generally at least 80% by volume, especially 90% by volume, of the inventive carbon material. The small distances between adjacent carbon phases result, in this way, in formation of an arrangement of mutually connected pores with a very small mean pore diameter, which penetrate the carbon skeleton in a spongelike manner. The arrangement of the carbon phase and of the pore phase can be recognized, for example, by analyzing the materials by means of transmission electron microscopy (TEM), especially by means of HAADF-STEM (HAADF-STEM: high angle annular darkfield scanning electron microscopy).

Similarly, in the composite materials provided in step i. of the process according to the invention, the (semi)metal oxide phase (phase A) on the one hand and the organic polymer phase (phase B) on the other hand are present in a co-continuous arrangement over wide areas, which means that phase A and phase B form predominantly, i.e. over wide areas, no insulated phase domains surrounded by an optionally continuous phase domain. Instead, the (semi)metal oxide phase A on the one hand and the polymer phase B on the other hand form continuous phase domains which are spatially separated from one another and penetrate one another, as can be seen by analysis of the materials by means of transmission electron microscopy (TEM), especially by means of HAADF-STEM (HAADF-STEM: high angle annular darkfield scanning electron microscopy).

With regard to the terms "continuous phase or phase domains", "discontinuous phase or phase domains" and "co-continuous phase or phase domains", reference is also made to W. J. Work et al. Definitions of Terms Related to Polymer Blends, Composites and Multiphase Polymeric Materials, (IUPAC Recommendations 2004), Pure Appl. Chem., 76 (2004), p. 1985-2007, especially p. 2003. According to this, the term "continuous" in relation to a phase means that within one of the domains of the particular phase a continuous path to all phase domain boundaries may be drawn without crossing a phase domain boundary. According to this, a co-continuous arrangement of a system consisting of two or more phases is understood to mean a phase-separated arrangement of the phases, in which within one domain of the particular phase a continuous path through either phase domain may be drawn to all phase domain boundaries without crossing any phase domain boundary. Accordingly, the phases in a co-continuous arrangement penetrate one another.

In the inventive carbon materials, the distances between the domains of adjacent C phases are small and are on average not more than 300 nm, frequently not more than 200 nm or not more than 100 nm, for example in the range from 0.5 to 300 nm, especially in the range from 1 to 200 nm or in the range from 1 to 100 nm.

In a preferred embodiment, the inventive carbon material has regions in which the distance between adjacent C phases is not more than 5 nm, for example 0.5 to 5 nm, especially 1 to 5 nm. In addition, the inventive carbon material may also have regions in which the mean distance between adjacent C phases is at least 5 nm, for example in the range from 5 nm to 300 nm, especially 10 nm to 200 nm or 15 to 200 nm.

In a specific embodiment, the inventive carbon material has essentially exclusively, particularly to an extent of at least 80% by volume and especially to an extent of at least 90% by volume, based on the total volume of the carbon material, those regions in which the distance between adjacent carbon phases is less than 10 nm, for example 0.5 to <10 nm, frequently 0.5 to 5 nm and especially 1 to 5 nm.

In a further embodiment, the inventive carbon material has those regions in which the distance between adjacent C phases is less than 10 nm, for example 0.5 to <10 nm or 0.5 to 5 nm, especially 1 to 5 nm, and also those regions in which the mean distance between adjacent C phases is at least 10 nm, for example in the range from 10 nm to 300 nm, especially 10 nm to 200 nm or 15 to 200 nm. The proportion by volume of the regions in which the mean distance between adjacent C phases is less than 10 nm and especially not more than 5 nm is then typically in the range from 5 to 70% by volume, and the proportion by volume of the regions in which the mean distance between adjacent C phases is at least 10 nm and especially at least 15 nm is then typically in the range from 30 to 95% by volume, based on the total volume of the carbon material.

The inventive particulate carbon material typically has micropores. This is understood to mean pores having a mean pore diameter d (corresponds to twice the mean pore radius r) below 10 nm, for example in the range from 1 to 5 nm. The specific volume of the micropores, i.e. the volume of the micropores per gram of the carbon material, is generally at least 0.1 $cm^3/g$, especially at least 0.2 $cm^3/g$, especially at least 0.3 $cm^3/g$, and is typically in the range from 0.1 to 1.5 $cm^3/g$, frequently in the range from 0.2 to 1.2 $cm^3/g$ and especially in the range from 0.3 to 1.0 $cm^3/g$. In a specific embodiment of the invention, the volume of the micropores per gram of the carbon material is in the range from 0.5 to 1 $cm^3/g$. The specific volume of the micropores can be determined by nitrogen sorption by the method of Barrett, Joyner and Halenda (BJH nitrogen sorption), which is described in DIN 66134 and forms the basis of the values reported here (see also E. P. Barrett, L. G. Joyner, P. P. Halenda, J. Am. Chem. Soc. 73 (1951) 373).

The inventive particulate carbon material may, as well as the micropores, also have mesopores. This is understood to mean pores having a mean pore diameter d in the range from 5 nm to 300 nm, especially in the range from 10 to 200 nm or 15 to 200 nm. The specific volume of the mesopores, i.e. the volume of the mesopores per gram of the carbon material, is then generally at least 0.1 $cm^3/g$ especially at least 0.2 $cm^3/g$ or 0.3 $cm^3/g$, and is, for example, in the range from 0.1 to 2.9 $cm^3/g$, and especially in the range from 0.2 to 2.7 $cm^3/g$ or in the range from 0.3 to 2.5 $cm^3/g$. The specific volume of the mesopores can be determined by BJH nitrogen sorption to DIN 66134.

The specific total pore volume of the inventive carbon material is typically in the range from 0.3 to 3 $cm^3/g$, frequently in the range from 0.5 to 2.9 $cm^3/g$ and especially in the range from 0.6 to 2.8 $cm^3/g$, determined by BJH nitrogen sorption to DIN 66134.

Due to the high content of micropores and optionally mesopores, the inventive carbon material has a high specific BET surface area which is typically in the range from 200 to 3000 $m^2/g$, frequently in the range from 500 to 3000 $m^2/g$, particularly in the range from 800 to 1500 $m^2/g$ and especially in the range from 900 to 1400 $m^2/g$, determined by nitrogen sorption by the method of Brunauer, Emmett and Teller described in DIN ISO 69277.

The inventive carbon material consists essentially of elemental carbon, generally to an extent of at least 85% by weight, frequently to an extent of at least 95% by weight, particularly to an extent of at least 98% by weight and especially to an extent of at least 99% by weight, based on the total weight of the carbon material. In addition, the inventive carbon material may comprise elements other than carbon, hereinafter extraneous elements, in a small amount. The proportion of the extraneous elements will generally not exceed 15% by weight, frequently 5% by weight particularly 2% by weight and especially 1% by weight, based on the total weight of the carbon material. Typical extraneous elements are hydrogen and oxygen, and optionally transition metals or halogen atoms from the preparation of the carbon material. The hydrogen content will generally not exceed 1% by weight, especially 0.5% by weight, based on the total weight of the carbon material. The halogen content will generally not exceed 1% by weight, especially 0.5% by weight, based on the total weight of the carbon material. The content will transition metals will generally not exceed 1% by weight, especially 0.5% by weight, based on the total weight of the carbon material. The oxygen content will generally not exceed 15% by weight, frequently 5% by weight, particularly 2% by weight, especially 1% by weight, based on the total weight of the carbon material. The carbon content and the content of extraneous atoms can be determined in a manner customary per se by elemental analysis.

The inventive carbon material is particulate. The particles may be regular or irregular in shape and have, for example, a symmetrical shape, for example a spherical, spheroidal or elliptical shape. They may, however, also have irregular shapes, for example shapes formed from several mutually penetrating spheres or ellipsoids, including raspberry morphology. The particles may also have a hollow structure, in which case the mutually penetrating C phase and some of the P phase which has essentially micropores form the wall of the cavity and the interior of the cavity is formed by mesopores or is completely empty.

Typically, the weight-average particle diameter of the particles is in the range from 20 nm to 50 µm, frequently in the range from 50 nm to 50 µm, particularly in the range from 200 nm to 20 µm, especially in the range from 1 µm to 20 µm. The particle sizes and particle size distributions reported here are based on the particle diameters discriminated by proportions by mass and determined by ultracentrifugation at 23° C. The determination is effected typically by means of an ultracentrifuge by standard methods, for example by the methods described by H. Cölfen, "Analytical Ultracentrifugation of Nanoparticles" in Encyclopedia of Nanoscience and Nanotechnology, (American Scientific Publishers, 2004), p. 67-88 or W. Mächtle and L. Börger in "Analytical Ultracentrifugation of Polymers and Nanoparticles", (Springer, Berlin, 2006).

The present invention also relates to a process for producing the particulate porous carbon material described here, and to the particulate porous carbon material obtainable by this process. The process according to the invention comprises the following steps:

i. providing a particulate composite material which has at least one organic polymer phase and at least one inorganic (semi)metal oxide phase, in which the organic polymer phase P and the inorganic (semi)metal oxide phase form essentially co-continuous phase domains, the mean distance between two adjacent domains of the (semi)metal oxide phase being not more than 50 nm, particularly not more than 20 nm, especially not more than 10 nm, for example 1 to 50 nm, particularly 0.7 to 20 nm and especially 1 to 10 nm, ii. carbonizing the organic polymer phase of the composite material, iii. removing the (semi)metal oxide phase by leaching.

Composite materials can be produced according to step i. of the process according to the invention in a manner known per se by what is called a twin polymerization. Twin polymerization is basically known, for example from Spange et al., Angew. Chem. Int. Ed., 46 (2007) 628-632, WO 2009/083083, WO 2009/133086, WO 2010/112580, WO 2010/112581, WO 2010/128144 and WO 2011/000858, to which reference is hereby made.

In the context of this invention, a twin polymerization is understood to mean the polymerization of a monomer M (called a twin monomer) which has a) at least one first, generally cationically polymerizable, organic monomer unit A and b) at least one metal or semimetal B which is bonded via oxygen to the polymerizable monomer unit A and forms metal oxides or semimetal oxides, under polymerization conditions, generally under cationic polymerization conditions, under which both the polymerizable monomer unit A and the polymerizable unit B synchronously polymerize with breakage of the bond between A and B. The polymerization is optionally effected in the presence of a particulate metal oxide or semimetal oxide.

These processes afford a nanocomposite material with high yields and good reproducibility. The polymerization product has both an inorganic (semi)metal oxide phase which comprises the (semi)metal present in the monomer and that present in the optionally used (semi)metal oxide particles, and an organic polymer phase which results from the polymerization of the monomer unit A. Within the particles, the different phases have a co-continuous arrangement, the phase domains of identical phases having average separations generally up to a maximum of 50 nm, particularly a maximum of 20 nm, especially a maximum of 10 nm, and being, for example, in the range from 0.5 to 50 nm, particularly 0.7 to 20 nm and especially 1 to 10 nm. The average distance between the proximate domains of the (semi)metal oxide phase, i.e. domains of the (semi)metal oxide phase separated by a single domain of the organic polymer phase, will generally not exceed 50 nm, particularly 20 nm, especially 10 nm. Likewise the average distance between the proximate domains of the organic polymer phase, i.e. domains of the organic polymer phase separated by a single domain of the (semi)metal oxide phase, will generally not exceed 50 nm, particularly 20 nm, especially 10 nm. However, in some instances, the average distance between the proximate domains of the organic polymer phase may be as high as 300 nm or as high as 100 nm. The mean distance between identical phases can be determined in the manner described above for determination of the dimensions of the C phases, for example by means of small-angle X-ray scattering (SAXS), or by means of transmission electron microscopy (TEM), especially by means of HAADF-STEM.

With regard to the removal of the (semi)metal oxide phase required in step iii., it has been found to be advisable when the (semi)metal present in the monomers M or in the (semi)metal oxide particles is selected from Si, Sn, Al, B, Ti and Zr. More particularly, the (semi)metal is silicon or aluminum, especially silicon.

Compounds suitable as twin monomers M are known from the prior art or can be prepared in an analogous manner to the methods described therein. Reference may be made here, for example, to the literature cited at the outset and to:

Silyl enol ethers (Chem. Ber. 119, 3394 (1986); J. Organomet. Chem. 244, 381 (1981); JACS 112, 6965 (1990))

Cycloboroxanes (Bull. Chem. Soc. Jap. 51, 524 (1978); Can. J. Chem. 67, 1384 (1989); J. Organomet. Chem. 590, 52 (1999))

Cyclosilicates (Chemistry of Heterocyclic Compounds, 42, 1518, (2006); Eur. J. Inorg. Chem. (2002), 1025; J. Organomet. Chem. 1, 93 (1963); J. Organomet. Chem. 212, 301 (1981); J. Org. Chem. 34, 2496 (1968); Tetrahedron 57, 3997 (2001) and WO 2009/083082 and WO2009/083083)

Cyclostannanes (J. Organomet. Chem. 1, 328 (1963))

Cyclozirconates (JACS 82, 3495 (1960)).

Suitable monomers M can be described by the general formula I:

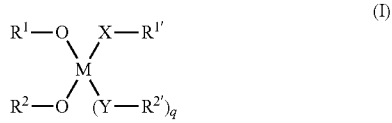

in which

M is a metal or semimetal, preferably a metal or semimetal of main group 3 or 4 or of transition group 4 of the Periodic Table, especially B, Al, Ti, Zr or Si, more preferably B, Si or Ti and especially Si;

$R^1$, $R^2$ may be the same or different and are each an Ar—C($R^a$,$R^b$)— radical in which Ar is an aromatic or heteroaromatic ring which optionally has 1 or 2 substituents selected from halogen, CN, $C_1$-$C_6$-alkyl, $C_1$-$C_6$-alkoxy and phenyl, and $R^a$, $R^b$ are each independently hydrogen or methyl or together are an oxygen atom or a methylidene group (=$CH_2$) and in particular are both hydrogen, or the $R^1O$ and $R^2O$ radicals together are a radical of the formula A

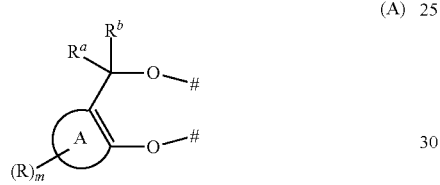

in which A is an aromatic or heteroaromatic ring fused to the double bond, m is 0, 1 or 2, the R radicals may be the same or different and are each selected from halogen, CN, $C_1$-$C_6$-alkyl, $C_1$-$C_6$-alkoxy and phenyl, and $R^a$, $R^b$ are each as defined above;

q according to the valency or charge of M is 0, 1 or 2 and especially 1,

X, Y may be the same or different and are each O or a chemical bond and especially oxygen;

$R^{1'}$, $R^{2'}$ may be the same or different and are each $C_1$-$C_6$-alkyl, $C_3$-$C_6$-cycloalkyl, aryl or an Ar'—C($R^{a'}$,$R^{b'}$)— radical in which Ar' is as defined for Ar and $R^{a'}$, $R^{b'}$ are each as defined for $R^a$, $R^b$ and in particular are hydrogen, or $R^{1'}$, $R^{2'}$ together with X and Y are a radical of the formula A, as defined above.

Also suitable for the twin copolymerization are monomers of the formula I in which M, $R^1$, $R^2$, q, qY and $R^{2'}$ are each as defined above, in which the $R^{1'}$ radical is a radical of the formula:

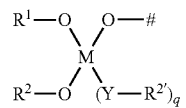

in which q, $R^1$, $R^2$, $R^{2'}$ and Y are each as defined above and # means the bond to M. Among these, preference is given to those monomers in which M, $R^1$, $R^2$, q, Y and $R^{2'}$ have the definitions specified as preferred, especially those in which the $R^1O$ and $R^2O$ radicals together are a radical of the formula A.

Also suitable for the twin copolymerization are monomers which derive from the monomers of the formula I in which M is Ti or Zr, q=1, specifically such that these monomers are p-oxido-bridged oligomers, e.g. tetramers.

In the monomers of the formula I, the molecular moieties corresponding to the $R^1$ and $R^2O$ radicals constitute the polymerizable organic monomer unit A. When X and Y are not a chemical bond and $R^{1'}X$ and $R^{2'}$ are not inert radicals such as $C_1$-$C_6$-alkyl, $C_3$-$C_6$-cycloalkyl or aryl, the $R^{1'}X$ and $R^{2'}Y$ radicals likewise constitute the polymerizable organic monomer unit A.

In the context of the invention, an aromatic radical, or aryl, is understood to mean a carbocyclic aromatic hydrocarbon radical such as phenyl or naphthyl.

In the context of the invention, a heteroaromatic radical, or hetaryl, is understood to mean a heterocyclic aromatic radical which generally has 5 or 6 ring members, where one of the ring members is a heteroatom selected from nitrogen, oxygen and sulfur, and 1 or 2 further ring members may optionally be a nitrogen atom and the remaining ring members are carbon. Examples of heteroaromatic radicals are furyl, thienyl, pyrrolyl, pyrazolyl, imidazolyl, oxazolyl, isoxazolyl, pyridyl, pyrimidinyl, pyridazinyl or thiazolyl.

In the context of the invention, a fused aromatic radical or ring is understood to mean a carbocyclic aromatic divalent hydrocarbon radical such as o-phenylene (benzo) or 1,2-naphthylene (naphtho).

In the context of the invention, a fused heteroaromatic radical or ring is understood to mean a heterocyclic aromatic radical as defined above, in which two adjacent carbon atoms form the double bond shown in formula A or in the formulae II and III.

In a first embodiment of the monomers of the formula I, the $R^1O$ and $R^2O$ groups together are a radical of the formula A as defined above, especially a radical of the formula Aa:

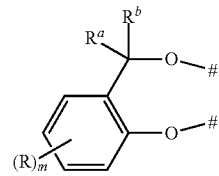

in which #, m, R, $R^a$ and $R^b$ are each as defined above. In the formulae A and Aa, the variable m is especially 0. When m is 1 or 2, R is especially a methyl or methoxy group. In the formulae A and Aa, $R^a$ and $R^b$ are especially each hydrogen.

Among the monomers of the first embodiment, preference is given especially to those monomers of the formula I in which q=1 and in which the X—$R^{1'}$ and Y—$R^{2'}$ groups together are a radical of the formula A, especially a radical of the formula Aa. Such monomers can be described by the following formulae II and IIa:

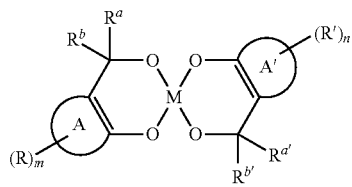

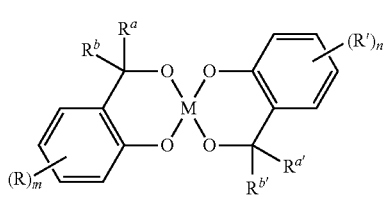

(IIa)

Among the twin monomers of the first embodiment, preference is further given to those monomers of the formula I in which q is 0 or 1 and in which the X—R$^{1'}$ group is a radical of the formula A' or Aa':

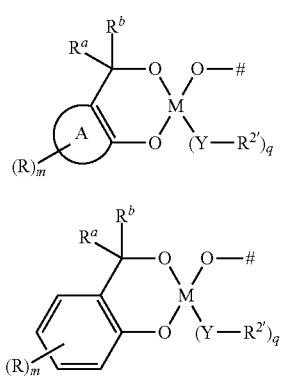

(A')

(A')

in which m, A, R, R$^a$, R$^b$, Y, R$^{2'}$ and q are each as defined above, and especially have the definitions specified as preferred.

Such monomers can be described by the following formulae II' or IIa':

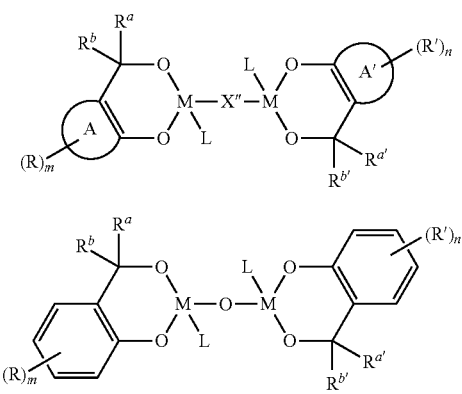

(II')

(IIa')

In the formulae II and II', the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti, especially Si;

A, A' are each independently an aromatic or heteroaromatic ring fused to the double bond;

m, n are each independently 0, 1 or 2, especially 0;

R, R' are each independently selected from halogen, CN, $C_1$-$C_6$-alkyl, $C_1$-$C_6$-alkoxy and phenyl, and are especially each independently methyl or methoxy;

R$^a$, R$^b$, R$^{a'}$, R$^{b'}$ are each independently selected from hydrogen and methyl, or R$^a$ and R$^b$ and/or R$^{a'}$ and R$^{b'}$ in each case together are an oxygen atom or =CH$_2$; in particular, R$^a$, R$^b$, R$^{a'}$, R$^{b'}$ are each hydrogen; and L is a (Y—R$^{2'}$)$_q$ group in which Y, R$^{2'}$ and q are each as defined above and where q is in particular 1.

In the formulae IIa and IIa', the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti, especially Si;

m, n are each independently 0, 1 or 2, especially 0;

R, R' are each independently selected from halogen, CN, $C_1$-$C_6$-alkyl, $C_1$-$C_6$-alkoxy and phenyl, and are especially each methyl or methoxy;

R$^a$, R$^b$, R$^{a'}$, R$^{b'}$ are each independently selected from hydrogen and methyl, or R$^a$ and R$^b$ and/or R$^{a'}$ and R$^{b'}$ in each case together are an oxygen atom; in particular, R$^a$, R$^b$, R$^{a'}$, R$^{b'}$ are each hydrogen, L is a (Y—R$^{2'}$)$_q$ group in which Y, R$^{2'}$ and q are each as defined above and where q is in particular 1.

One example of a monomer of the formula II or IIa is 2,2'-spirobis[4H-1,3,2-benzodioxasilin] (compound of the formula IIa where M=Si, m=n=0, R$^a$=R$^b$=R$^{a'}$=R$^{b'}$=hydrogen). Such monomers are known from prior international patent applications WO2009/083082 and PCT/EP 2008/010169 [WO2009/083083] or can be prepared by the methods described there. A further example of a monomer IIa is 2,2-spirobi[4H-1,3,2-benzodioxaborin] (Bull. Chem. Soc. Jap. 51 (1978) 524): (compound of the formula IIa where M=B, m=n=0, R$^a$=R$^b$=R$^{a'}$=R$^{b'}$=hydrogen). A further example of a monomer IIa' is bis(4H-1,3,2-benzodioxaborin-2-yl)oxide (compound of the formula IIa' where M=B, m=n=0, L absent (q=0), R$^a$=R$^b$=R$^{a'}$=R$^{b'}$=hydrogen; Bull. Chem. Soc. Jap. 51 (1978) 524).

The monomers M in principle also include the monomers of the formulae III and IIIa defined below.

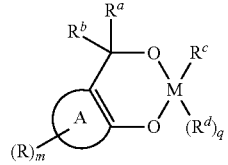

(III)

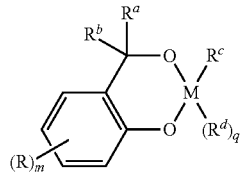

(IIIa)

In formula III, the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti, especially Si;

A is an aromatic or heteroaromatic ring fused to the double bond;

m is 0, 1 or 2, especially 0;

q according to the valency and charge of M is 0, 1 or 2;

R is independently selected from halogen, CN, $C_1$-$C_6$-alkyl, $C_1$-$C_6$-alkoxy and phenyl, and is especially methyl or methoxy;

$R^a$, $R^b$ are each independently selected from hydrogen and methyl, or $R^a$ and $R^b$ may together be an oxygen atom or =$CH_2$, and are especially both hydrogen;

$R^c$, $R^d$ are the same or different and are each selected from $C_1$-$C_6$-alkyl, $C_3$-$C_6$-cycloalkyl and aryl, and are especially each methyl.

In formula IIIa, the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti, especially Si;

m is 0, 1 or 2, especially 0;

q according to the valency and charge of M is 0, 1 or 2;

R radicals are each independently selected from halogen, CN, $C_1$-$C_6$-alkyl, $C_1$-$C_6$-alkoxy and phenyl, and are especially methyl or methoxy;

$R^a$, $R^b$ are each independently selected from hydrogen and methyl, or $R^a$ and $R^b$ may together be an oxygen atom or =$CH_2$, and are especially both hydrogen;

$R^c$, $R^d$ are the same or different and are each selected from $C_1$-$C_6$-alkyl, $C_3$-$C_6$-cycloalkyl and aryl, and are especially each methyl.

Examples of monomers of the formula III or IIIa are 2,2-dimethyl-4H-1,3,2-benzodioxasilin (compound of the formula IIIa where M=Si, q=1, m=0, $R^a$=$R^b$=hydrogen, $R^c$=$R^d$=methyl), 2,2-dimethyl-4H-1,3,2-benzooxazasilin, (compound of the formula IIIa where M=Si, q=1, m=0, G=NH, $R^a$=$R^b$=hydrogen, $R^c$=$R^d$=methyl), 2,2-dimethyl-4-oxo-1,3,2-benzodioxasilin (compound of the formula IIIa where M=Si, q=1, m=0, $R^a$+$R^b$=O, $R^c$=$R^d$=methyl) and 2,2-dimethyl-4-oxo-1,3,2-benzooxazasilin (compound of the formula IIIa where M=Si, q=1, m=0, G=NH, $R^a$+$R^b$=O, $R^c$=$R^d$=methyl). Such monomers are known, for example, from Wieber et al. Journal of Organometallic Chemistry; 1, 1963, 93, 94. Further examples of monomers IIIa are 2,2-diphenyl[4H-1,3,2-benzodioxasilin] (J. Organomet. Chem. 71 (1974) 225); 2,2-di-n-butyl[4H-1,3,2-benzodioxastannin] (Bull. Soc. Chim. Belg. 97 (1988) 873); 2,2-dimethyl[4-methylidene-1,3,2-benzodioxasilin] (J. Organomet. Chem., 244, $C_5$-$C_8$ (1983)); 2-methyl-2-vinyl[4-oxo-1,3,2-benzodioxazasilin].

The monomers of the formula III or IIIa are preferably not copolymerized alone, but rather in combination with the monomers of the formulae II and IIa.

In a further preferred embodiment, the monomers of the formula I are those described by the formula IV, V, Va, VI or VIa.

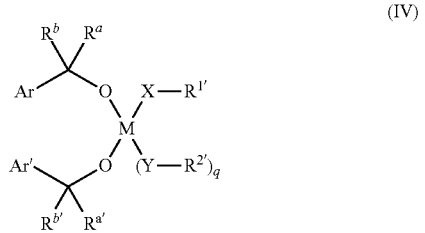

(IV)

In formula IV, the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti, especially Si;

Ar, Ar' are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1;

X, Y are the same or different and are each O or a chemical bond; and $R^{1'}$, $R^{2'}$ are the same or different and are each $C_1$-$C_6$-alkyl, $C_3$-$C_6$-cycloalkyl, aryl or an Ar"—$C(R^{a''},R^{b''})$— radical in which Ar" is as defined for Ar and R', and $R^{a''}$, $R^{b''}$ are each as defined for $R^a$, $R^b$ or for $R^{a'}$, $R^{b'}$, or $R^{1'}$, $R^{2'}$ together with X and Y are a radical of the formula A, especially a radical of the formula Aa, as defined above.

Among the monomers of the formula IV, preference is given especially to those monomers in which q=0, 1 or 2, especially q=1, and the X—$R^{1'}$ and Y—$R^{2'}$ groups are the same or different and are each an Ar"—$C(R^{a''},R^{b''})$O group, and are preferably each an Ar"-$CH_2$O group ($R^a$=$R^b$=hydrogen), where Ar" is as defined above and is especially selected from furyl, thienyl, pyrrolyl and phenyl, where the four rings mentioned are unsubstituted or have one or two substituents selected from halogen, CN, $C_1$-$C_6$-alkyl, $C_1$-$C_6$-alkoxy and phenyl. Such monomers can be described by the following formulae V and Va:

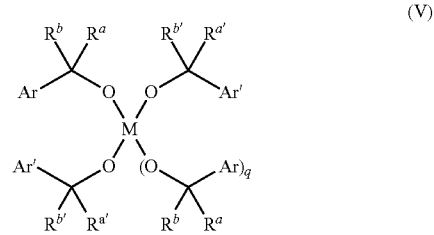

(V)

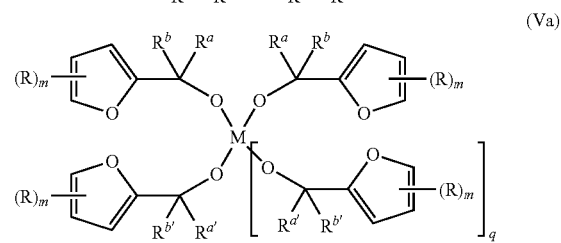

(Va)

In the formulae V and Va, the variables are each defined as follows:

M is a metal or semimetal, preferably a metal or semimetal of main group 3 or 4 or of transition group 4 of the Periodic Table, especially B, Al, Ti, Zr or Si, more preferably B, Si or Ti and especially Si;

Ar, Ar' in formula V are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1.

In formula Va, m is 0, 1 or 2 and especially 0, and R is selected from halogen, CN, $C_1$-$C_6$-alkyl, $C_1$-$C_6$-alkoxy and phenyl, and especially from methyl and methoxy.

One example of a monomer of the formula V or Va is tetrafurfuryloxysilane (compound of the formula Va where M=Si, q=1, m=0, $R^a$=$R^b$=hydrogen): Angew. Chem. Int. Ed., 46 (2007) 628. A further example of the monomer V or Va is tetrafurfuryl orthotitanate: Adv. Mater. 2008, 20, 4113. This compound tetramerizes to ($\mu^4$-oxido)-hexakis(m-furfuryloxo)octakis(furfuryloxo)tetratitanium, which is used as a twin monomer. A further example of the monomer V or Va is trifurfuryloxyborane (compound of the formula Va where M=B, q=0, m=0, $R^a$=$R^b$=hydrogen).

The monomers of the formula IV also include those monomers in which the X—$R^{1'}$ and Y—$R^{2'}$ groups are the same or different and are each selected from $C_1$-$C_4$-alkyl, especially methyl, $C_3$-$C_6$-cycloalkyl and aryl, for example phenyl, i.e. X and Y are each a chemical bond. Such monomers can be described by the following formulae VI and VIa:

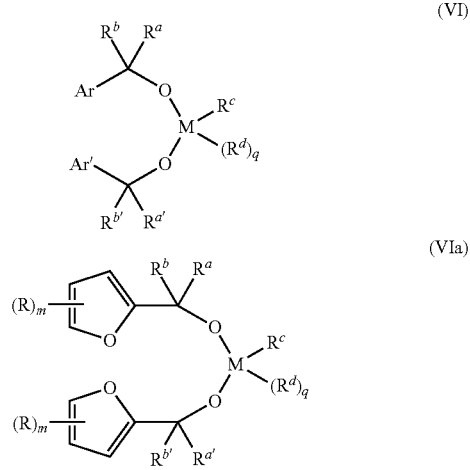

In the formulae VI and VIa, the variables are each defined as follows:
M is a metal or semimetal, preferably a metal or semimetal of main group 3 or 4 or of transition group 4 of the Periodic Table, especially B, Al, Ti, Zr or Si, more preferably B, Si or Ti and especially Si;
Ar, Ar' in formula VI are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;
$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;
q according to the valency of M is 0, 1 or 2 and especially 1;
$R^c$, $R^d$ are the same or different and are each selected from $C_1$-$C_6$-alkyl, $C_3$-$C_6$-cycloalkyl and aryl, and are especially each methyl.

In formula VIa, m is 0, 1 or 2 and is especially 0, and R is selected from halogen, CN, $C_1$-$C_6$-alkyl, $C_1$-$C_6$-alkoxy and phenyl and especially from methyl and methoxy.

One example of a monomer of the formula VI or VIa is bis(furfuryloxy)dimethylsilane (compound of the formula VIa where M=Si, q=1, m=0, $R^a$=$R^b$=hydrogen, $R^c$=$R^d$=methyl).

Such monomers of the formulae IV, V, Va, VI and VIa are known from the prior art, for example from the article by Spange et al. cited at the outset and the literature cited therein, or can be prepared in an analogous manner.

The monomers of the formula VI or VIa are preferably not polymerized alone, but rather in combination with the monomers of the formulae V and Va.

In a further embodiment of the invention, the twin monomers M are selected from aromatic compounds which have an average of at least two trialkylsilyloxymethyl groups and/or aryldialkylsilyloxymethyl groups bonded to identical or different aryl groups, especially to benzene rings. Alkyl in this context is alkyl having 1 to 4 carbon atoms, especially methyl or ethyl. Aryl in this context is phenyl or naphthyl, especially phenyl. One example of a trialkylsilyloxymethyl group is trimethylsilyloxymethyl (($H_3C$)$_3$Si—O—$CH_2$—). One example of an aryldialkylsilyloxymethyl group is dimethylphenylsilyloxymethyl (phenyl($H_3C$)$_2$Si—O—$CH_2$—). In this case, the aryl ring to which the trialkylsilyloxymethyl groups and/or aryldialkylsilyloxymethyl groups are bonded may have further substituents, for example $C_1$-$C_4$-alkoxy such as methoxy, $C_1$-$C_4$-alkyl, trialkylsilyloxy or aryldialkylsilyloxy. More particularly, such twin monomers are phenolic compounds which have at least two trialkylsilyloxymethyl groups and/or aryldialkylsilyloxymethyl groups bonded to phenyl rings of the phenolic compound, where the OH groups of the phenolic compounds may be etherified, especially with trialkylsilyl groups and/or aryldialkylsilyl groups. Such compounds can be prepared by hydroxymethylation of aromatic compounds, especially of phenolic compounds, and subsequent reaction with trialkylhalosilanes or with aryldialkylhalosilanes, and in the case of phenolic starting materials not only the hydroxymethyl groups but also the phenolic OH groups are converted to the corresponding silyl ethers. Examples of aromatic compounds are especially phenolic compounds such as phenol, cresols and bisphenol A (=2,2-bis-(4-hydroxyphenyl)propane).

The aforementioned aromatic compounds which have an average of at least two trialkylsilyloxymethyl groups and/or aryldialkylsilyloxymethyl groups bonded to identical or different aryl groups, especially to phenyl rings, can be homo- or copolymerized as such. Preference is given to copolymerizing the aromatic compounds which have an average of at least two trialkylsilyloxymethyl groups and/or aryldialkylsilyloxymethyl groups bonded to identical or different aryl groups, especially to phenyl rings, together with the monomers of the formula II, IIa, II' or II'a or with the compounds of the formulae IV or V or Va.

Monomers M preferred in accordance with the invention are selected from the monomers of the general formulae II, IIa, II' and II'a, especially from the monomers of the general formula IIa, and among these especially from those monomers of the general formulae II, IIa, II' and II'a, in which M is Si, with most preference given to monomers of the formula IIa, in which M is Si.

The monomers M are polymerized typically in an organic aprotic solvent or solvent mixture. Preference is given to those aprotic solvents in which the nanocomposite material formed is insoluble (solubility<1 g/l at 25° C.). As a result, particularly small particles of the polymer material are formed under polymerization conditions.

It is assumed that the use of aprotic solvent in which the nanocomposite material formed in the polymerization is insoluble promotes particle formation in principle. If the polymerization is performed in the presence of a particulate inorganic material, the formation of the particles will probably be controlled by the presence of the particulate inorganic material, and this will prevent the formation of a coarse particulate material.

The aprotic solvent is preferably selected such that the monomer is at least partly soluble. This is understood to mean that the solubility of the monomer in the solvent under polymerization conditions is at least 50 g/l, especially at least 100 g/l. In general, the organic solvent is selected such that the solubility of the monomers at 20° C. is 50 g/l, especially at least 100 g/l. More particularly, the solvent is selected such that the monomers are substantially or completely soluble therein, i.e. the ratio of solvent to monomer M is selected such that, under polymerization conditions, at least 80%, especially at least 90% or the entirety of the monomers MM is present in dissolved form.

"Aprotic" means that the solvent used for polymerization comprises essentially no solvents which have one or more protons which are bonded to a heteroatom such as O, S or N and are thus more or less acidic. The proportion of protic solvents in the solvent or solvent mixture used for the polymerization is accordingly less than 10% by volume, particularly less than 1% by volume and especially less than 0.1% by volume, based on the total amount of organic solvent. The polymerization of the monomers M is preferably performed in the substantial absence of water, i.e. the concentration of water at the start of the polymerization is less than 500 ppm, based on the amount of solvent used.

The solvent may be inorganic or organic or be a mixture of inorganic and organic solvents. It is preferably an organic solvent.

Examples of suitable aprotic organic solvents are halohydrocarbons such as dichloromethane, chloroform, dichloroethane, trichloroethane, 1,2-dichloroethane, 1,1,1-trichloroethane, 1-chlorobutane, chlorobenzene, dichlorobenzenes, fluorobenzene, and also pure hydrocarbons, which may be aliphatic, cycloaliphatic or aromatic, and mixtures thereof with halohydrocarbons. Examples of pure hydrocarbons are acyclic aliphatic hydrocarbons having generally 2 to 8 and preferably 3 to 8 carbon atoms, especially alkanes such as ethane, iso- and n-propane, n-butane and isomers thereof, n-pentane and isomers thereof, n-hexane and isomers thereof, n-heptane and isomers thereof, and n-octane and isomers thereof, cycloaliphatic hydrocarbons such as cycloalkanes having 5 to 8 carbon atoms, such as cyclopentane, methylcyclopentane, cyclohexane, methylcyclohexane, cycloheptane, and aromatic hydrocarbons such as benzene, toluene, xylenes, mesitylene, ethylbenzene, cumene (2-propylbenzene), isocumene (1-propylbenzene) and tert-butylbenzene. Preference is also given to mixtures of the aforementioned hydrocarbons with halogenated hydrocarbons, such as halogenated aliphatic hydrocarbons, for example such as chloromethane, dichloromethane, trichloromethane, chloroethane, 1,2-dichloroethane and 1,1,1-trichloroethane and 1-chlorobutane, and halogenated aromatic hydrocarbons such as chlorobenzene, 1,2-dichlorobenzene and fluorobenzene.

Examples of inorganic aprotic solvents are especially supercritical carbon dioxide, carbon oxide sulfide, carbon disulfide, nitrogen dioxide, thionyl chloride, sulfuryl chloride and liquid sulfur dioxide, the three latter solvents also being able to act as polymerization initiators.

The monomers M are typically polymerized in the presence of a polymerization initiator or catalyst. The polymerization initiator or catalyst is selected such that it initiates or catalyzes a cationic polymerization of the monomers M, i.e. of the monomer unit A, and the formation of the (semi)metal oxide phase. Accordingly, in the course of polymerization of the monomers M, the monomer unit A polymerizes and the (semi)metal oxide phase forms synchronously. The term "synchronously" does not necessarily mean that the polymerization of the monomer unit A and the formation of the (semi) metal oxide phase proceed at the same rate. Instead, "synchronously" means that these processes are coupled kinetically and are triggered by the cationic polymerization conditions.

Suitable polymerization initiators or catalysts are in principle all substances which are known to catalyze cationic polymerizations. These include protic acids (Brønsted acids) and aprotic Lewis acids. Preferred protic catalysts are Brønsted acids, for example organic carboxylic acids, for example trifluoroacetic acid or lactic acid, and especially organic sulfonic acids such as methanesulfonic acid, trifluoromethanesulfonic acid or toluenesulfonic acid. Likewise suitable are inorganic Brønsted acids such as HCl, $H_2SO_4$ or $HClO_4$. The Lewis acids used may, for example, be $BF_3$, $BCl_3$, $SnCl_4$, $TiCl_4$, or $AlCl_3$. The use of Lewis acids bound in complex form or dissolved in ionic liquids is also possible. The polymerization initiator or catalyst is used typically in an amount of 0.1 to 10% by weight, preferably 0.5 to 5% by weight, based on the monomer M.

The temperatures required for the polymerization of the monomers M are typically in the range from 0 to 150° C., especially in the range from 10 to 120° C. In the case of an acid-catalyzed polymerization, the polymerization temperatures are preferably in the range from 0 to 100° C. and especially in the range from 10 to 80° C.

In one embodiment of the invention, the polymerization of the monomers M is performed in the presence of at least one particulate material. With regard to step iii) of the process according to the invention, the material is an inorganic oxidic material, preferably a (semi)metal oxide. Among these, preference is given to the oxides of titanium, of silicon, of tin, of aluminum or of boron, and especially silicon dioxide and aluminum oxide.

The particulate material generally has particle sizes of not more than 5 µm, preferably not more than 1 µm, especially of not more than 0.5 µm. If the particles are agglomerates of primary particles, the particle size is understood to mean the size of the primary particles (primary particle size) which form the agglomerate. The particulate inorganic material preferably has a mean particle size (weight-average particle diameter), and in the case of agglomerates a primary particle size (weight-average primary particle diameter), in the range from 5 to 5000 nm, frequently in the range from 5 to 1000 nm and especially in the range from 10 to 500 nm or 15 to 250 nm. The mean particle diameters reported here are based on the mass average or weight average determined in a manner known per se by means of light scattering or an ultracentrifuge.

Examples of preferred particulate (semi)metal oxides are titanium dioxide powders, especially pyrogenic titanium dioxide, aluminum oxide powders, especially pyrogenic aluminum oxide, and silica powders, especially finely divided silicas such as fumed silica or precipitated silica, in which the particles preferably have particle sizes or primary particle sizes within the ranges specified above. Such materials are commercially available, for example under the trade names Aerosil® and Aeroxide® (Evonik), Cab-O-Sil® and Spectral® (Cabot) or Syloid® (Grace). In a particularly preferred embodiment of the invention, the inorganic particulate material is a finely divided silica, especially a fumed silica. Also suitable are zeolites, especially those with acidic active sites.

In a preferred configuration of this embodiment, the particulate (semi)metal oxide comprises at least a portion of the polymerization initiator or catalyst. This can be achieved, for example, by treating the particulate (semi)metal oxide with the polymerization initiator or catalyst, for example by suspending the particulate (semi)metal oxide in a solution of the polymerization initiator or catalyst, for example in a solution in the organic solvent used for polymerization.

When the polymerization is performed in presence of a particulate (semi)metal oxide, the latter is generally used in an amount of 0.01 to 100 parts by weight, especially in an amount of 0.05 to 50 parts by weight, based on 1 part by weight of the monomers M (or in an amount of 1 to 10 000% by weight, especially in an amount of 5 to 5000% by weight, based on the total amount of the monomers M, or in a ratio of particulate (semi)metal oxide to the total amount of the monomers M in the range from 100:1 to 1:100, especially 50:1 to 1:20). In a preferred embodiment of the invention, the particulate (semi)metal oxide is used in an amount of 0.01 to 1 parts by weight, especially in an amount of 0.055 to 0.5 part by weight, based on 1 part by weight of the monomers M. In another preferred embodiment of the invention, the particulate material is used in an amount of 1 to 100 parts by weight, especially in an amount of 1.5 to 50 parts by weight, based on 1 part by weight of the monomers M. While, in the former case, the properties of the particulate composite material thus obtainable are determined by the constituents formed in the polymerization, the particles obtainable in the polymerization in the second case have a core which consists of the particulate (semi)metal oxide used in the polymerization, and a shell which is arranged on the core and consists of the composite material obtained by polymerization of the monomers M.

Before further processing, the composite material thus obtained can be washed with an organic solvent or solvent mixture to remove impurities. In addition, it may be advantageous to dry and/or to comminute the composite material before further processing.

In a second step, ii., of the process according to the invention, the particulate composite material produced in step i. is carbonized.

For this purpose, the particulate composite material obtained in step i. is typically heated with substantial exclusion of oxygen to temperatures above 500° C., especially of at least 700° C., for example to temperatures in the range from 500 to 1500° C., especially in the range from 700 to 1200° C. "With substantial exclusion of oxygen" means that the oxygen partial pressure in the reaction zone in which the carbonization is performed is low and preferably will not exceed 20 mbar, especially 10 mbar. Preference is given to performing the carbonization in an inert gas atmosphere, for example under nitrogen or argon. The inert gas atmosphere will preferably comprise less than 1% by volume, especially less than 0.1% by volume, of oxygen.

The particulate composite material is preferably used for carbonization in the form of a dry, i.e. substantially solvent-free, powder. "Solvent-free" means here and hereinafter that the composite material comprises less than 1% by weight, especially less than 0.1% by weight, of solvent.

Optionally, the carbonization is performed in the presence of an oxidizing agent which promotes the formation of graphite, for example of a transition metal halide such as iron trichloride. This achieves the effect that the carbon in the inventive carbon material is present predominantly in the form of graphite or graphene units, i.e. in the form of polycyclic fused structural units, in which every carbon atom forms covalent bonds to three further carbon atoms. The amount of such oxidizing agents is generally 1 to 20% by weight, based on the composite material. If such an oxidizing agent is used in the carbonization, the procedure is typically to mix the composite material and the oxidizing agent with one another and to carbonize the mixture in the form of a substantially solvent-free powder. Optionally, the oxidizing agent is removed after the carbonization, for example by extractively washing the oxidizing agent, for example using a solvent or solvent mixture in which the oxidizing agent and the reaction products thereof are soluble, or by evaporating.

In this way, in step ii., a preferably particulate material composed of carbon and (semi)metal oxide is obtained, which has a carbon phase (C phase) and at least one inorganic (semi)metal oxide phase, said C phase and said inorganic (semi)metal oxide phase forming essentially co-continuous phase domains with irregular arrangement, where the mean distance between two adjacent domains of the (semi)metal oxide phase is not more than 50 nm, particularly not more than 20 nm, especially not more than 10 nm, and is, for example, in the range from 0.5 to 50 nm, particularly 0.7 to 20 nm and especially 1 to 10 nm. With regard to the determination of the mean distances between two adjacent domains of the (semi)metal oxide phase, the above for the composite material obtained in step i. applies in the same way. With regard to the particle sizes of the material, the statements made for the carbon material apply in the same way.

In step iii. of the process according to the invention, the at least one (semi)metal oxide phase is leached out of the particulate material obtained in step ii.

Surprisingly, both in the course of carbonization in step ii. and in the course of leaching of the (semi)metal oxide phase, the phase structure of the composite material obtained in step i. is substantially preserved. The leaching of the (semi)metal oxide phase out of the composite material composed of carbon and (semi)metal oxide obtained in step ii. forms the inventive particulate porous carbon material. The pores in the carbon material are probably formed in those regions in which the at least one (semi)metal oxide phase is present in the composite material composed of carbon and (semi)metal oxide obtained in step ii.

The leaching of the at least one (semi)metal oxide phase out of the particulate material obtained in step ii. is possible in a simple manner by treatment of the particulate material obtained in step ii. with an aqueous solution of a nonoxidizing acid or of an aqueous alkali which is suitable for dissolving (semi)metal oxides in an aqueous medium. Suitable examples are alkali metal hydroxide solutions such as sodium hydroxide solution or potassium hydroxide solution, or aqueous acids such as aqueous hydrochloric acid or hydrofluoric acid. Also suitable is gaseous HF, especially when the (semi)metal oxide phase is silicon dioxide. If an aqueous alkali metal hydroxide solution is used, the concentration of alkali metal hydroxide is typically in the range from 1 to 50% by weight. If an aqueous nonoxidizing acid such as aqueous hydrochloric acid or hydrofluoric acid is used, the acid concentration is typically in the range from 1 to 60% by weight. The leaching of the (semi)metal oxide phase is effected typically at temperatures in the range from 10 to 150° C., for example at 20-25° C. and using aqueous HF. The time required for leaching of the (semi)metal oxide phase can be determined by the person skilled in the art by routine experiments. It naturally depends on the type of solvent used and the temperature, and is typically in the range from 1 h to 24 h.

The inventive particulate porous carbon material thus obtained can be washed before further use, for example to remove impurities, with a solvent, for example water or a mixture of water and a water-miscible organic solvent or solvent mixture. It may also be advantageous to dry and/or to comminute the inventive particulate porous carbon material before further use.

The inventive particulate porous carbon material can be produced easily and in a large amount by the process according to the invention. It is additionally suitable for a multitude of applications, for example as materials for gas stores, as filter material, catalyst support, in supercapacitors, as anode material for lithium ion batteries, in solar cells or for water purification.

The porous carbon materials thus obtained are particularly suitable as a constituent of electrode materials in electrochemical cells, especially in lithium cells.

In the context of this invention, an electrochemical cell or battery is understood to mean batteries, capacitors and accumulators (secondary batteries) of any kind, especially alkali metal cells or batteries, for example lithium, lithium ion, lithium-sulfur and alkaline earth metal batteries and accumulators, also in the form of high-energy or high-performance systems, and the electrolytic capacitors and double-layer capacitors which are known by the names of Supercaps, Goldcaps, BoostCaps or Ultracaps.

More particularly, the inventive particulate porous carbon materials are suitable for electrochemical cells based on the transfer of alkali metal ions, especially for lithium metal, sodium-sulfur, lithium-sulfur and lithium ion cells and batteries, and especially for lithium secondary cells and lithium secondary batteries. The inventive porous carbon materials are particularly suitable for electrochemical cells from the group of the alkali metal-sulfur cells such as sodium-sulfur cells or lithium-sulfur cells.

In lithium-sulfur cells, the inventive particulate porous carbon materials are employed in particular in the form of a sulfur-containing composite material. Such a sulfur-containing composite material comprises elemental sulfur and at least one inventive particulate porous carbon material. Such composite materials are electroactive and are suitable as cathode material for alkali metal-sulfur cells, especially for lithium-sulfur cells, but also for sodium-sulfur cells.

In the sulfur-containing composite materials, even small amounts of inventive porous carbon materials are sufficient for significantly improving the properties of the cathode material. The inventive sulfur-containing composite material typically comprises the inventive carbon material in an amount of 1 to 45% by weight, particularly in an amount of 2 to 30% by weight and especially 3 to 20% by weight, based on the sulfur-containing composite material. The amount of elemental sulfur is typically in the range from 55 to 99% by weight, particularly in the range from 70 to 98% by weight and especially in the range from 80 to 97% by weight, based on the sulfur-containing composite material.

Some of the inventive porous carbon material can be replaced by conventional carbon materials such as conductive blacks or inorganic fillers.

The production of the inventive sulfur-containing composite material is possible in a simple manner by incorporation of the desired amount of the inventive porous carbon material into a melt of elemental sulfur. The temperature required for that purpose is typically in the range from 120 to 300° C. and preferably in the range from 120 to 150° C. Alternatively, the inventive porous carbon material can also be incorporated into a solution of elemental sulfur in a suitable organic solvent and then the solvent can be removed. Examples of suitable solvents are especially aromatic hydrocarbons and haloaromatic hydrocarbons such as toluene, xylenes and chlorobenzene, and also carbon disulfide and dibromethane.

The inventive sulfur-containing composite material is particularly suitable as an electroactive constituent for cathodes in alkali metal-sulfur cells, especially in lithium-sulfur cells. The invention therefore also provides for the use of the sulfur-containing composite material in anodes for alkali metal-sulfur cells, particularly for lithium-sulfur cells, especially lithium-sulfur secondary cells, and a cathode for lithium-sulfur cells, especially lithium-sulfur secondary cells, which comprises an inventive sulfur-containing composite material.

In addition to the inventive sulfur-containing composite material, the cathode generally comprises at least one suitable binder for consolidation of the electroactive constituents of the sulfur-containing composite material and of the optional further electrically conductive or electroactive constituents of the cathode material. In addition, the cathode generally has electrical contacts for supply and removal of charges. The amount of inventive sulfur-containing composite material, based on the total mass of the cathode material, minus any current collectors and electrical contacts, is generally at least 20% by weight, frequently at least 30% by weight and especially at least 40% by weight, for example 20 to 80% by weight, frequently 30 to 70% by weight, particularly 40 to 65% by weight and especially 50 to 60% by weight.

Suitable further conductive or electroactive constituents are known from the prior art cited at the outset and relevant monographs (see, for example, M. E. Spahr, Carbon Conductive Additives for Lithium-Ion Batteries, in M. Yoshio et al. (eds.) Lithium Ion Batteries, Springer Science+Business Media, New York 2009, p. 117-154 and literature cited therein). Useful further electrically conductive or electroactive constituents in the inventive cathodes include, for example, carbon black, graphite, carbon fibers, carbon nanofibers, carbon nanotubes or electrically conductive polymers. Typically, about 2.5 to 40% by weight of the conductive material are used in the anode together with 50 to 97.5% by weight, frequently with 60 to 95% by weight, of the inventive sulfur-containing composite material, the figures in % by weight being based on the total mass of the anode material, minus any current collectors and electrical contacts.

Useful binders for the production of a cathode using the aforementioned electroactive materials in principle include all prior art binders suitable for cathode materials, as known from the prior art cited at the outset and relevant monographs (see, for example, A. Nagai, Applications of PVdF-Related Materials for Lithium-Ion Batteries, in M. Yoshio et al. (eds.) Lithium Ion Batteries, Springer Science+Business Media, New York 2009, p. 155-162 and literature cited therein, and also H. Yamamoto and H. Mori, SBR Binder (for negative electrode) and ACM Binder (for positive electrode), ibid., p. 163-180). Useful binders include especially the following polymeric materials:

polyethylene oxide (PEO), cellulose, carboxymethylcellulose (CMC), polyethylene, polypropylene, polytetrafluoroethylene, polyacrylonitrile-methyl methacrylate, polytetrafluoroethylene, styrene-butadiene copolymers, tetrafluoroethylene-hexafluoroethylene copolymers, polyvinylidene difluoride (PVdF), polyvinylidene difluoride hexafluoropropylene copolymers (PVdF-HFP), tetrafluoroethylene hexa-fluoropropylene copolymers, tetrafluoroethylene, perfluoroalkyl-vinyl ether copolymers, vinylidene fluoride-hexafluoropropylene copolymers, ethylene-tetrafluoroethylene copolymers, vinylidene fluoride-chlorotrifluoroethylene copolymers, ethylene-chlorofluoroethylene copolymers, ethylene-acrylic acid copolymers (with and without inclusion of sodium ions), ethylene-methacrylic acid copolymers (with and without inclusion of sodium ions), ethylene-methacrylic ester copolymers (with and without inclusion of sodium ions), polyimides and polyisobutene.

The binder is optionally selected with consideration of the properties of any solvent used for the preparation. The binder is generally used in an amount of 1 to 10% by weight, based on the overall mixture of the cathode material, i.e. sulfur-containing composite material and optionally further electroactive or conductive materials. Preferably 2 to 8% by weight and especially 3 to 7% by weight are used.

The cathode can be produced in a manner customary per se by standard methods as known from the prior art cited at the outset and from relevant monographs (see, for example, R. J. Brodd, M. Yoshio, Production processes for Fabrication of Lithium-Ion Batteries, in M. Yoshio et al. (eds.) Lithium Ion Batteries, Springer Science+Business Media, New York 2009, p. 181-194 and literature cited therein). For example, the cathode can be produced by mixing the inventive sulfur-containing composite material, optionally using an organic solvent or solvent mixture (for example N-methylpyrrolidinone or a hydrocarbon solvent), with the optional further constituents of the cathode material (further electroactive or electrically conductive constituents and/or organic binder), and optionally subjecting it to a shaping process or applying it to an inert metal foil, for example Au, Ag or Cu foil. This is optionally followed by drying. This is done, for example, using a temperature of 80 to 150° C. The drying operation can also take place under reduced pressure and lasts generally for 3 to 48 hours. Optionally, it is also possible to employ a melting or sintering process for the shaping.

The present invention also provides alkali metal-sulfur cells, especially lithium-sulfur cells, especially lithium-sulfur secondary cells which comprise at least one cathode comprising an inventive electroactive material.

Such cells generally have at least one inventive cathode, an anode suitable for lithium-sulfur cells, an electrolyte and optionally a separator.

With regard to suitable anode materials, suitable electrolytes and suitable separators, and to possible arrangements, reference is made to the relevant prior art, for example the prior art cited at the outset, and to appropriate monographs and reference works: for example Wakihara et al. (editor) in *Lithium Ion Batteries*, 1$^{st}$ edition, Wiley VCH, Weinheim, 1998; David Linden: *Handbook of Batteries* (McGraw-Hill Handbooks), 3$^{rd}$ edition, McGraw-Hill Professional, New York 2008; J. O. Besenhard: *Handbook of Battery Materials*. Wiley-VCH, 1998; M. Yoshio et al. (ed.) *Lithium Ion Batteries*, Springer Science+Business Media, New York 2009; K. E. Aifantis, S. A. Hackney, R. V. Kumar, (ed.), *High Energy Density Lithium Batteries*, Wiley-VCH, 2010.

Useful anodes include especially those anode materials in which the anode material comprises graphite, metallic lithium, a lithium-graphite compound, a lithium alloy, for example lithium-silicon alloys, nanocrystalline silicon or lithium-metal oxides such as lithium titanate (e.g. $Li_4Ti_5O_{12}$), as an electroactive constituent.

In addition to the electroactive constituents, the anodes may also comprise further constituents, for example electrically conductive or electroactive constituents such as carbon black, graphite, carbon fibers, carbon nanofibers, carbon nanotubes or electrically conductive polymers, and the binders mentioned above in connection with the cathode.

Between the electrodes may be arranged a separator impregnated with the electrolyte, in particular with a liquid electrolyte. Examples of separators are especially glass fiber nonwovens and porous organic polymer films such as porous films of polyethylene, polypropylene, PVdF etc. Instead of a combination of electrolyte and separator, it is also possible to use polymer electrolytes.

The two electrodes, i.e. the anode and the cathode, are connected to one another in a manner known per se using a liquid or else solid electrolyte and optionally a suitable separator. For this purpose, for example, a separator can be applied to, for example laminated onto, one of the two electrodes provided with an output conductor (anode or cathode), and impregnated with the electrolyte, and then the oppositely charged electrode provided with an output conductor can be applied, and the sandwich thus obtained can optionally be wound and introduced into a battery housing. The procedure may also be to layer the output conductor, cathode, separator, anode, output conductor constituents in the form of sheets or films to form a sandwich, optionally to wind the sandwich, to envelop it into a battery housing, and then to impregnate the arrangement with the electrolyte.

Useful liquid electrolytes include especially nonaqueous solutions (water content generally <20 ppm) of lithium salts and molten lithium salts, for example solutions of lithium hexafluorophosphate, lithium perchlorate, lithium hexafluoroarsenate, lithium trifluoromethylsulfonate, lithium bis(trifluoromethylsulfonyl)imide or lithium tetrafluoroborate, especially lithium hexafluorophosphate or lithium tetrafluoroborate, in suitable aprotic solvents, for example ethylene carbonate, propylene carbonate, dioxolane and mixtures thereof, and also mixtures thereof with one or more of the following solvents: dimethyl carbonate, diethyl carbonate, dimethoxyethane, methyl propionate, ethyl propionate, butyrolactone, acetonitrile, ethyl acetate, methyl acetate, toluene and xylene, especially in a mixture of ethylene carbonate and diethyl carbonate. The solid electrolytes used may, for example, be ionically conductive polymers.

The inventive lithium-sulfur cells may also have a prismatic thin film structure, in which a solid thin film electrolyte is arranged between a film which constitutes an anode and a film which constitutes a cathode. A central cathode output conductor is arranged between each of the cathode films in order to form a double-faced cell configuration. In another embodiment, it is possible to use a single-faced cell configuration in which a single cathode output conductor is assigned to a single anode/separator/cathode element combination. In this configuration, an insulating film is typically arranged between individual anode/separator/cathode/output conductor element combinations.

The figures and examples which follow serve to illustrate the invention and should not be understood in a restrictive manner.

The TEM analyses and HAADF-STEM analyses were conducted with a Tecnai F20 transmission electron microscope (FEI, Eindhoven, the Netherlands) at a working voltage of 200 kV in the ultrathin layer technique (embedding of the samples into synthetic resin as a matrix).

The specific surface area and the pore size distribution were analyzed by determination of the nitrogen absorption-desorption isotherms to DIN 66134 by the method according to Barret, Joyner and Halender. The BET surface area was determined to DIN ISO 9277 by means of nitrogen sorption.

The thermogravimetry studies were conducted with a TGA 7 thermogravimetric analyzer from Perkin Elmer using a platinum crucible and a heating rate of 40 K/min.

FIG. 1: TEM analysis of the sample from example 7.3 (bar 50 nm)

Figure 2:
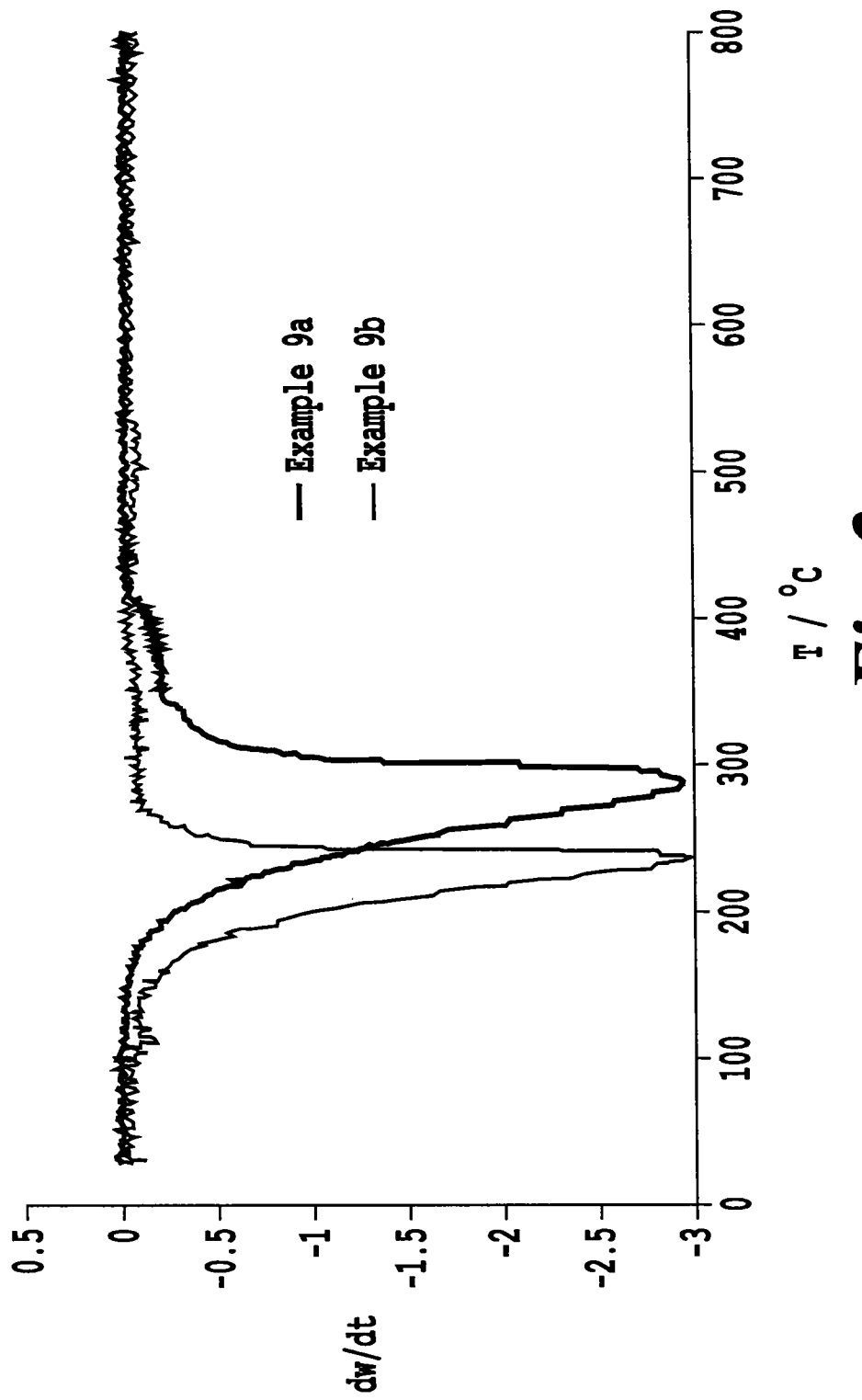
FIG. 2: Thermogravimetry analysis of a sulfur-containing composite material containing sulfur and an inventive carbon material (Example 9a) and of a sulfur-containing composite material containing sulfur and a composite material composed of carbon and silicon dioxide (Example 9b).

FIG. 2: Thermogravimetry analysis of the sample from examples 9a and 9b

Starting Materials:

2,2'-Spirobi[4H-1,3,2-benzodioxasilin] was prepared by the method specified in WO 2010/112580.

The particulate materials used were fumed silicas of the Aerosil® 300 (primary particle size 7 nm) and Aerosil® OX 50 (primary particle size 40 nm) type.

Toluene and dichloromethane were used in p.a. quality.

EXAMPLES 1 to 7

General Method for Production of the Carbon Material Using Particulate Materials 1) 1 g of the particulate material specified in table 1 was suspended in 200 ml of dichloromethane. To this were added 240 mg of methanesulfonic acid, and the dispersion thus obtained was stirred at 22° C. for 15 min. Subsequently, the solvent was removed under reduced pressure. The solid thus obtained was dissolved in 200 ml of toluene. To this was added dropwise a solution of 2 g of 2,2'-spirobi[4H-1,3,2-benzodioxasilin] in 50 ml of toluene, and the mixture was stirred at 22° C. for 15 h. Subsequently, the pulverulent solid was filtered off and dried at 40° C. under reduced pressure to constant weight.

2) The powder obtained in step 1 was subsequently carbonized in a tubular furnace in an argon stream at 800° C. or 1100° C. for 2 h. In this way, a black powder was obtained.

3) The powder obtained in step 1 was subsequently stored in 40% aqueous HF for 3 d. Subsequently, the remaining powder was filtered off, washed with water and ethanol, and dried at 40° C. under reduced pressure to constant weight.

EXAMPLE 8

General Method for Production of the Carbon Material without Use of Particulate Materials 1) 240 mg of methanesulfonic acid were dissolved in 200 ml of toluene. To this was added dropwise a solution of 2 g of 2,2'-spirobi[4H-1,3,2-benzodioxasilin] in 50 ml of toluene, and the mixture was stirred at 22° C. for 15 h. Subsequently, the pulverulent solid was filtered off and dried at 40° C. under reduced pressure to constant weight.

2) The powder obtained in step 1 was subsequently carbonized in a tubular furnace in an argon stream at 800° C. or 1100° C. for 2 h. In this way, a black powder was obtained.

3) The powder obtained in step 1 was subsequently stored in 40% aqueous HF for 3 d. Subsequently, the remaining powder was filtered off, washed with water and ethanol, and dried at 40° C. under reduced pressure to constant weight.

The powders thus obtained had, according to elemental analysis, a carbon content of >84% by weight and a silicon content of <2% by weight. The oxygen content was below 15% and the hydrogen content below 1.5%.

The TEM image of FIG. 1 shows hollow carbon particles obtained from step 3 of example 7 (example 7.3). It can be seen that the carbon material of the hollow carbon particles is porous.

TABLE 1

Production of the carbonaceous material:

| Example | 1:X | Particulate material | T [° C.] | BET [$m^2 g^{-1}$] | Micropore volume [$cm^3 g^{-1}$] | Maximum pore volume [$cm^3 g^{-1}$] |
|---|---|---|---|---|---|---|
| 1 | 1:0.2 | Aerosil ® 300 | 800 | 1290 | 0.46 | 2.33 |
| 2 | 1:0.5 | Aerosil ® 300 | 800 | 1310 | 0.46 | 1.82 |
| 3 | 1:2 | Aerosil ® 300 | 800 | 1290 | 0.46 | 1.81 |
| 4 | 1:8 | Aerosil ® 300 | 800 | 790 | 0.28 | 0.49 |
| 5 | 1:0.5 | Aerosil ® OX50 | 800 | 1130 | 0.40 | 1.95 |
| 6 | 1:2 | Aerosil ® OX50 | 800 | 1370 | 0.49 | 1.63 |
| 7 | 1:8 | Aerosil ® OX50 | 800 | 1170 | 0.41 | 0.63 |
| 8 | — | — | 800 | 1410 | 0.77 | 1.07 |

EXAMPLE 9a

Production of a Sulfur-Containing Composite Material from Sulfur and an Inventive Carbon Material 1 g of the powder from example 7.3 was melted with 6 g of elemental sulfur at a temperature of 140° C. and left at this temperature for 5 h. The solid obtained in the course of cooling was ground to a powder by means of a mortar and pestle.

EXAMPLE 9b

Production of a Sulfur-Containing Composite Material from Sulfur and a Composite Material Composed of Carbon and Silicon Dioxide 1 g of the powder from example 7.2 was melted with 6 g of elemental sulfur at a temperature of 140° C. and left at this temperature for 5 h. The solid obtained in the course of cooling was ground to a powder by means of a mortar and pestle.

The materials of examples 9a and 9b were analyzed by means of thermogravimetry (see FIG. 2).

It is clear from the comparison of the curves in FIG. 2 that the carbon material from example 7.3, i.e. the material after removal of the inorganic (semi)metal oxide phase, compared to the material from example 7.2, has a significantly increased binding capacity for sulfur, which is evident by an increased sublimation temperature of the sulfur compared to the composite material composed of carbon and silicon dioxide (example 9b). This indicates that the sulfur in the sulfur-carbon composite material (example 9a) has been intercalated into the pores of the carbon material from example 7.3.

EXAMPLE 10

Production of a Cathode Using a Sulfur-Containing Composite Material According to Example 9a First, an ink of the sulfur-containing composite material was produced in a water/isopropanol mixture. For this purpose, 0.02 g of polyvinyl alcohol was dissolved in 16.0 g of water/isopropanol (10:1 v/v) in a laboratory glass bottle. To this solution were added 0.47 g of conductive black (Super P from Timcal AG, 6743 Bodio, Switzerland), 0.07 g of synthetic graphite (KS6 from Timcal AG, 6743 Bodio, Switzerland) and 1.71 g of the sulfur-containing composite material from example 9a, and the mixture was stirred until a homogeneous suspension was obtained. For dispersion, the suspension was transferred into a stainless steel grinding vessel and then ground using a ball mill (Pulverisette from Fritsch), stirring with stainless steel balls at 300 rpm for 30 min. The dispersion gave rise to a very homogeneous ink with creamy consistency.

The ink was sprayed onto aluminum foil by means of the air brush method on a vacuum table (temperature: 60° C.). Nitrogen was used for spraying. A solids loading of 2.5 mg/cm² was achieved.

REFERENCE EXAMPLE 10a

Production of a Cathode Using Sulfur

The cathode was produced in analogy to the procedure described for example 10, except that the ink was produced by producing the following suspension:
In a laboratory glass bottle, 0.02 g of polyvinyl alcohol was dissolved in 16.0 g of water/isopropanol (10:1, v/v). To this were added 1.25 g of conductive black (Super P from Timcal AG, 6743 Bodio, Switzerland), 0.07 g of synthetic graphite (KS6, from Timcal AG, 6743 Bodio, Switzerland) and 0.93 g of sulfur, and the mixture was stirred until a homogeneous suspension was obtained. The further processing to give an ink and the production of the electrode were according to the procedure described for example 10.

EXAMPLE 11

For the electrochemical characterization of the electrodes from examples 10 and 10a, an electrochemical cell was constructed. Anode: Li foil of thickness 50 μm, separator: Celgard 2340 of thickness 38 μm, cathode from example 10 or 10a as described above. Electrolyte 1M LiTFSI (LiN(SO$_2$CF$_3$)$_2$) in a 1:1 (v/v) mixture of dioxolane and dimethoxyethane. The charging and discharging of the cell was conducted with a current of 7.50 mA between potentials of 1.8-2.5. Results are summarized in table 2.

TABLE 2

| Cathode | Discharge capacity 5$^{th}$ cycle [mAh/g S] | Discharge capacity 50 cycle [mAh/g S] | Discharge capacity 500 cycle [mAh/g S] |
|---|---|---|---|
| Reference example 10a | 1150 | 810 | — |
| Example 10 | 820 | 815 | 440 |

The invention claimed is:

1. A composite material, comprising:
elemental sulfur; and
at least one particulate porous carbon material, comprising:
  a carbon phase; and
  at least one pore phase arranged in the carbon phase,
wherein the carbon phase forms, with the pore phase, co-continuous phase domains with irregular arrangement, and
wherein a distance between adjacent domains of the pore phase is not more than 50 nm.

2. The composite material of claim 1, wherein the particulate porous carbon material has at least 0.1 cm³/g of pores having a pore diameter of from 1 to 5 nm, determined by BJH nitrogen sorption to DIN 66134.

3. The composite material of claim 2, wherein the particulate porous carbon material has at least 0.1 cm³/g of pores having a pore diameter of from 5 to 300 nm, determined by BJH nitrogen sorption to DIN 66134.

4. The composite material of claim 1, wherein the particulate porous carbon material has a total pore volume of from 0.3 to 3 cm³/g, determined by BJH nitrogen sorption to DIN 66134.

5. The composite material of claim 1, wherein the particulate porous carbon material has a specific BET surface area of from 200 to 3000 m²/g, determined by nitrogen sorption to DIN ISO 9277.

6. The composite material of claim 1, wherein the particulate porous carbon material has a weight-average particle diameter of from 20 nm to 50 μm.

7. The composite material of claim 1, comprising:
1 to 45% by weight of carbon; and
55 to 99% by weight of sulfur, based in each case on a total weight of the composite material.

8. The composite material of claim 1, wherein the particulate porous carbon material has a carbon content of at least 95% by weight, based on a total weight of the particulate porous carbon material.

9. A process for producing the composite material of claim 1, the process comprising:
incorporating the particulate porous carbon material into a melt of elemental sulfur.

10. The process of claim 9, further comprising, prior to the incorporating:
  i. providing a particulate composite material comprising an organic polymer phase and an inorganic (semi)metal oxide phase, wherein the organic polymer phase and the inorganic (semi)metal oxide phase form co-continuous phase domains, and a mean distance between two adjacent domains of the (semi)metal oxide phase is not more than 50 nm,
  ii. carbonizing the organic polymer phase, and
  iii. removing the inorganic (semi)metal oxide phase by leaching,
  wherein the providing (i) comprises polymerization of at least one monomer M comprising:
  a) a cationically polymerizable, organic monomer unit, and
  b) (semi)metal which is bonded via oxygen to the cationically polymerizable monomer unit and forms (semi) metal oxides,
  under cationic polymerization conditions.

11. The process of claim 10, wherein the (semi)metal is silicon.

12. The process of claim 10, wherein the at least one monomer M is polymerized in the presence of a particulate (semi)metal oxide.

13. The process of claim 12, wherein the particulate (semi)metal oxide is silicon dioxide.

14. The process of claim 12, wherein the particulate (semi)metal oxide has a mean particle diameter of from 5 nm to 5000 nm.

15. A method of producing an electrochemical cell, the method comprising:
producing the electrochemical cell with the composite material of claim 1.

16. A cathode for alkali metal-sulfur cells, the cathode comprising:
the composite material of claim 1.

17. An alkali metal-sulfur cell, comprising the cathode according to claim 16.

* * * * *